(12) United States Patent
Uchida

(10) Patent No.: US 10,268,152 B2
(45) Date of Patent: Apr. 23, 2019

(54) IMAGE FORMING SYSTEM, MOBILE TERMINAL APPARATUS, AND IMAGE FORMING APPARATUS

(71) Applicant: KYOCERA Document Solutions Inc., Osaka (JP)

(72) Inventor: Yuzuru Uchida, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/740,504

(22) PCT Filed: Jun. 16, 2016

(86) PCT No.: PCT/JP2016/068019
§ 371 (c)(1),
(2) Date: Dec. 28, 2017

(87) PCT Pub. No.: WO2017/002636
PCT Pub. Date: Jan. 5, 2017

(65) Prior Publication Data
US 2018/0188678 A1    Jul. 5, 2018

(30) Foreign Application Priority Data

Jun. 30, 2015 (JP) .................................. 2015-130877

(51) Int. Cl.
*G03G 15/00* (2006.01)
*G03G 15/08* (2006.01)
*B41J 29/38* (2006.01)
*G06F 3/12* (2006.01)
*H04N 1/00* (2006.01)

(52) U.S. Cl.
CPC ............ *G03G 15/556* (2013.01); *B41J 29/38* (2013.01); *G03G 15/0856* (2013.01); *G06F 3/12* (2013.01); *H04N 1/00* (2013.01); *H04N 1/0049* (2013.01)

(58) Field of Classification Search
CPC .. G06F 3/1293; G06F 3/1294; G03G 15/5016
See application file for complete search history.

(56) References Cited

U.S. PATENT DOCUMENTS

2013/0027737 A1* 1/2013 Suzuki ............... G03G 15/5016
358/1.14

FOREIGN PATENT DOCUMENTS

JP         H11-194674         7/1999

* cited by examiner

*Primary Examiner* — Hongmin Fan

(57) ABSTRACT

An image forming apparatus (2) comprises: a consumables managing unit (42) that detects consumables exhaustion of a printing device (31), and a wireless beacon (34) that transmits a consumables exhaustion signal without specifying a receiver when the consumables exhaustion of the printing device is detected. One or plural mobile terminal apparatuses (1) comprises a wireless communication device (11) that receives the consumables exhaustion signal, and a notification device that notifies of consumables exhaustion when the consumables exhaustion signal is received.

3 Claims, 2 Drawing Sheets

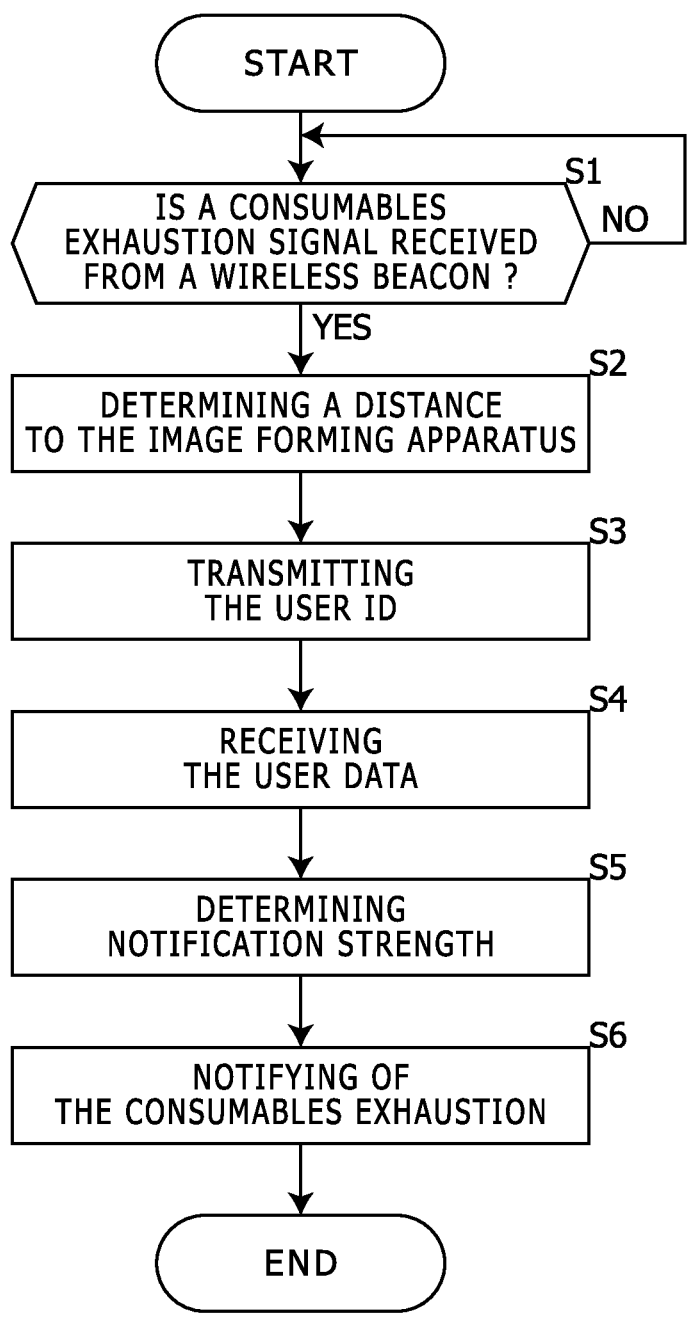

IMAGE FORMING SYSTEM, MOBILE TERMINAL APPARATUS, AND IMAGE FORMING APPARATUS

TECHNICAL FIELD

The present invention relates to an image forming system, a mobile terminal apparatus, and an image forming apparatus.

BACKGROUND ART

When an operator directly operates a copier and starts copying and thereafter a jam or the like occurs, the copier transmits a detection signal of this trouble to a receiver that the operator carries, and when receiving the detection signal, the receiver notifies the user of the occurrence of the trouble (e.g. see PATENT LITERATURE #1).

CITATION LIST

Patent Literature

PATENT LITERATURE #1: Japanese Patent Application Publication No. H11-194674.

SUMMARY OF INVENTION

Technical Problem

In the aforementioned technique, for example, if consumables exhaustion occurs, then the detection signal is transmitted only to a user who executed a job that causes the consumables exhaustion. Therefore, another user does not notice the consumables exhaustion, and until the user who executed a job that causes the consumables exhaustion supplies consumables, an action of the image forming apparatus are stopped, and consequently, usage efficiency of the image forming apparatus decreases.

The present invention has been conceived in order to solve this problem and provide an image forming system, a mobile terminal apparatus, and an image forming apparatus that in the image forming apparatus an action suspension time is short when the consumables exhaustion occurs.

Solution to Problem

An image forming system according to the present invention includes an image forming apparatus, and one or plural mobile terminal apparatuses. The image forming apparatus includes a consumables managing unit that detects consumables exhaustion of a printing device, and a wireless beacon that transmits a consumables exhaustion signal without specifying a receiver when the consumables exhaustion of the printing device is detected. The one or plural mobile terminal apparatuses includes a wireless communication device that receives the consumables exhaustion signal, and a notification device that notifies of consumables exhaustion when the consumables exhaustion signal is received.

A mobile terminal apparatus according to the present invention includes a wireless communication device that receives a consumables exhaustion signal from a wireless beacon of an image forming apparatus, and a notification processing unit that activates a notification device that notifies of consumables exhaustion when receiving the consumables exhaustion signal transmitted without specifying a receiver by the wireless beacon.

An image forming apparatus includes a printing device, a consumables managing unit that detects consumables exhaustion of the printing device, and a wireless beacon that transmits a consumables exhaustion signal without specifying a receiver when the consumables exhaustion of the printing device is detected.

Advantageous Effect of Invention

According to the present invention, in an image forming apparatus an action suspension time is short when consumables exhaustion occurs.

These and other objects, features and advantages of the present invention will become more apparent upon reading of the following detailed description along with the accompanied drawings.

BRIEF DESCRIPTION OF DRAWINGS

FIG. 2 shows a flowchart that explains a behavior of a mobile terminal apparatus 1 shown in FIG. 1.

DESCRIPTION OF EMBODIMENTS

Figure 1:
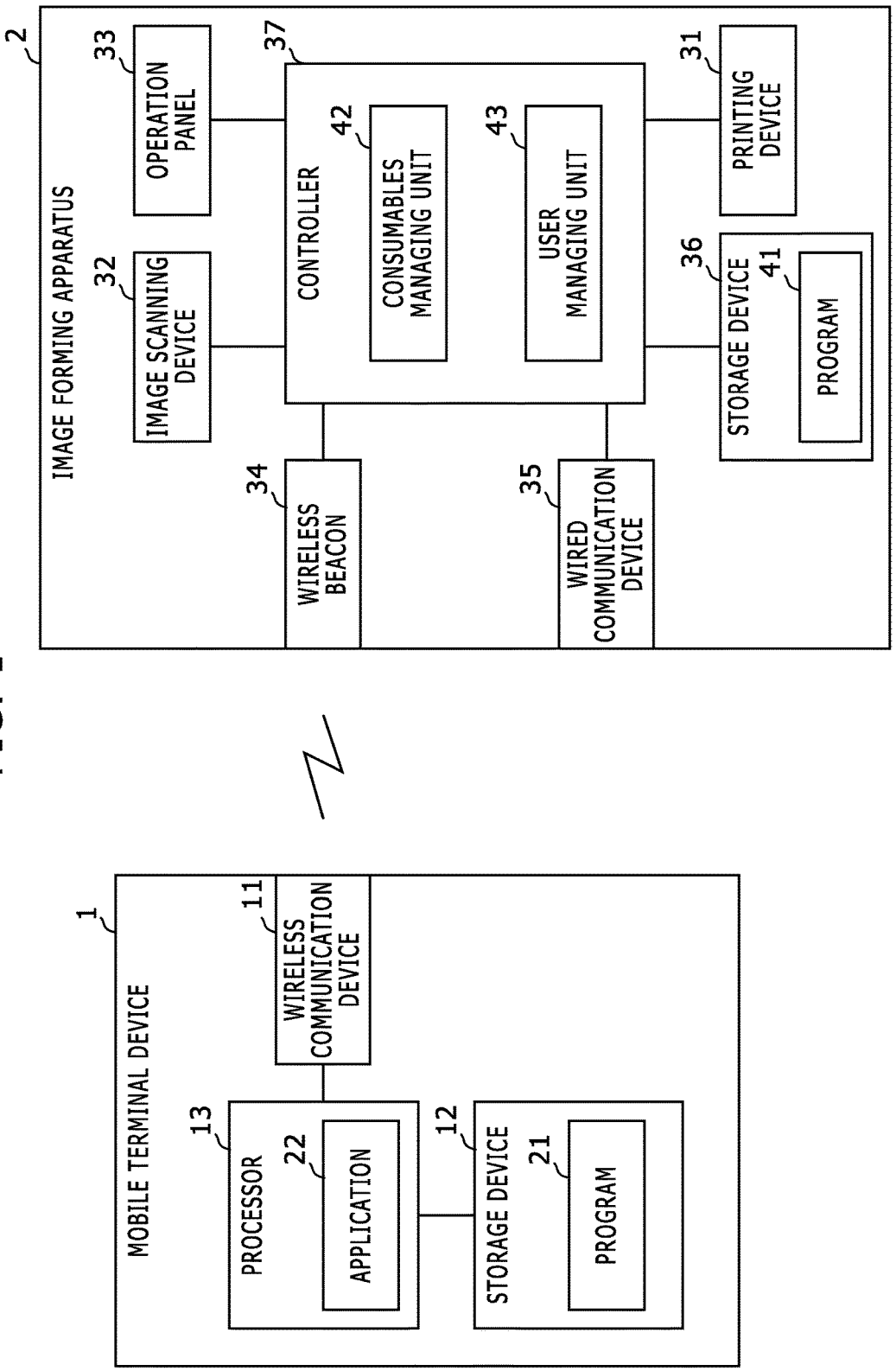
FIG. 1 shows a block diagram that indicates a configuration of an image forming system according to an embodiment of this invention.

Hereinafter, an embodiment of the present invention will be explained with reference to drawings.

FIG. 1 shows a block diagram that indicates a configuration of an image forming system according to an embodiment of this invention. In the system shown in FIG. 1, one or plural users carries one or plural mobile terminal apparatuses 1 such as mobile phone device or smartphone, respectively. An image forming apparatus 2 is located at a site of the user(s).

The mobile terminal apparatus 1 is, for example, a portable device such as a smartphone, and includes a wireless communication device 11, a storage device 12, a processor 13 and the like.

The wireless communication device 11 is an internal device that performs data communication according to a predetermined wireless communication standard such as wireless LAN (Local Area Network) or Bluetooth (registered trademark).

The storage device 12 is a non-volatile storage device such as a flash memory or a hard disk. In the storage device 12, a program 21 and the like are stored. For example, the program 21 is downloaded from a server on Internet and installed.

The processor 13 is a computer that includes a CPU (Central Processing Unit), a RAM (Random Access Memory), a ROM (Read Only Memory) and the like, and loads the program 21 to the RAM and executes the program 21 using the CPU, and thereby embodies an application 22 that notifies of consumables exhaustion ("Empty" or "Near empty") of the image forming apparatus 2.

Further, the mobile terminal apparatus 1 includes as a notification device a vibrator that generates vibration, an audio device (speaker, audio processing circuit and the like) that outputs sound, and/or the like.

Meanwhile, in FIG. 1, the image forming apparatus 2 is a multi function peripheral, a copier or the like used by registered plural users, and includes a printing device 31, an image scanning device 32, an operation panel 33, a wireless beacon 34, a wired communication device 35, a storage device 36, and a controller 37.

The printing device 31 is an internal device that performs printing an image on a printing paper sheet in an electrographic manner page by page on the basis of printing image data. The printing device 31 includes a development device that performs development with toner, and one or plural paper sheet cassettes that store(s) a paper sheet as consumables. To the development device, a toner cartridge is set as consumables.

The image scanning device 32 is an internal device that optically scans a document image of a document and thereby generates image data (i.e. scanning data) of the document image.

The operation panel 33 is arranged on a surface of a housing of the image forming apparatus 2, and includes a display device that displays sorts of information to a user and an input device that detects a user operation. For example, a liquid crystal display is used as the display device. A key switch, a touch panel or the like is used as the input device.

The wireless beacon 34 is a device that transmits a wireless signal according to a predetermined standard. As the wireless beacon 34, for example, iBeacon that uses Bluetooth (registered trademark) can be used.

The wired communication device 35 is an electronic circuit connected to a network such as a wired LAN or the like, and performs data communication with another apparatus connected to the network.

Further, the storage device 36 is a non-volatile storage device such as a flash memory or a hard disk. In the storage device 36, a program 41 and the like are stored.

Further, the controller 37 includes a computer, ASIC (Application Specific Integrated Circuit) and/or the like, and controls internal devices of the image forming apparatus 2. The controller 37 executes the program 41 using the computer, and thereby embodies a consumables managing unit 42 and a user managing unit 43.

The consumables managing unit 42 detects consumables exhaustion ("Empty" or "Near empty") of consumables such as print paper sheet or toner used in the printing device 31. Further, the consumables managing unit 42 causes the wireless beacon 34 to transmit a consumables exhaustion signal when the consumables exhaustion of the printing device 31 is detected. The wireless beacon 34 transmits the consumables exhaustion signal without specifying a receiver in accordance with an instruction from the consumables managing unit 42.

The user managing unit 43 manages user data such as property data (a year that a user joined his/her company in, or the like) of the registered user and/or usage frequency of the image forming apparatus 2 of the registered user in a database for each user ID of the registered user, and transmits the user data as a response in accordance with a request from the mobile terminal apparatus 1.

In each mobile terminal apparatus 1, the wireless communication device 11 is capable of receiving a signal transmitted by the wireless beacon 34, and when the wireless communication device 11 receives the consumables exhaustion signal transmitted by the wireless beacon 34, the application 22 activates the notification device and thereby notifies the user of consumables exhaustion.

Notification strength (vibration strength, sound pressure or the like) of the notification device may be fixed or may be changed on the basis of sorts of information.

The application 22 may notify of the consumables exhaustion using the notification device with a notification strength corresponding to a distance between the image forming apparatus 2 and this mobile terminal apparatus 1 so that the larger notification strength is set for the shorter distance. Thus, the shorter the distance therebetween is, the larger the vibration or the sound is for the notification.

The distance therebetween may be calculated from a current position of the mobile terminal apparatus 1 and a locating position of the image forming apparatus 2. For example, the current position of the mobile terminal apparatus 1 can be determined using an unshown GPS (Global Positioning System) receiving device. The locating position of the image forming apparatus 2 may be registered in the mobile terminal apparatus 1 in advance or the image forming apparatus 2 may notify of the locating position using the consumable exhaustion signal.

The application 22 may notify of the consumables exhaustion using the notification device with a notification strength corresponding to a usage frequency of the image forming apparatus 2 so that the larger notification strength is set for the higher usage frequency. The application 22 may notify of the consumables exhaustion using the notification device with a notification strength corresponding to a year that a user of this mobile terminal apparatus 1 joined his/her company in so that the larger notification strength is set for the later year that the user joined the company. In these cases, for example, the application 22 transmits a user ID of the mobile terminal apparatus 1 using the wireless communication device 11 to the image forming apparatus 2 when the consumables exhaustion signal is received, receives user data corresponding to the user ID from the image forming apparatus 2, and notifies of the consumables exhaustion with a notification strength corresponding to the received user data using the notification device. In the image forming apparatus 2, the user ID is received by the wireless beacon or an unshown wireless communication device, and user data corresponding to this user ID is determined by the user managing unit 34 and is transmitted by the wireless beacon 34 or an unshown wireless communication device.

Further, in case of paper sheet empty, information that indicates a paper sheet cassette of the paper sheet empty may be included in the consumables exhaustion signal, and the application 22 may determine the notification strength in accordance with the paper sheet cassette indicated by the consumables exhaustion signal and notify of the consumables exhaustion with the determined notification strength using the notification device. For example, the notification strength of a paper sheet cassette for facsimile is set to be higher than that of a paper sheet cassette for printing from a personal computer or the like.

The following part explains a behavior of each apparatus when detecting consumables exhaustion of the image forming apparatus 2. FIG. 2 shows a flowchart that explains a behavior of a mobile terminal apparatus 1 shown in FIG. 1.

In each mobile terminal apparatus 1, the application 22 watches whether the signal is received from the wireless beacon 34 or not (in Step S1); when detecting that the signal is received from the wireless beacon 34, the application 22 collects information required to determine a notification strength (in Steps S2 to S4), determines the notification strength on the basis of the information (in Step S5), and notifies of consumables exhaustion with the determined notification strength using the notification device (in Step S6).

As the information required to determine the notification strength, the application 22 determines a distance between the mobile terminal apparatus 1 and the image forming apparatus 2 in the aforementioned manner (in Step S2).

Further, the application 22 transmits the user ID to the image forming apparatus 2 (in Step S3), and receives the aforementioned user data as the information required to determine the notification strength (in Step S4).

For example, if plural users exist in a range that the signal reaches from the wireless beacon 34, then the mobile terminal apparatuses 1 substantially simultaneously notify the users of the consumables exhaustion. At that time, the users are notified of the consumables exhaustion with different notification strengths corresponding to user's situations, and the user notified with the higher notification strength notices the consumables exhaustion more easily.

In the aforementioned embodiment, the image forming apparatus 2 includes the consumables managing unit 42 that detects consumables exhaustion of the printing device 31, and the wireless beacon 34 that transmits a consumables exhaustion signal without specifying a receiver when the consumables exhaustion of the printing device 31 is detected. Each mobile terminal apparatus 1 includes the wireless communication device 11 that receives the consumables exhaustion signal, and the notification device that notifies of consumables exhaustion when the consumables exhaustion signal is received.

Consequently, without limiting to a user who is using the image forming apparatus 2 and an administrator, one or plural users around the image forming apparatus 2 is/are notified of the consumables exhaustion, and therefore, the consumables exhaustion is resolved in a short time. Therefore, an action suspension time of the image forming apparatus 2 is short when consumables exhaustion occurs.

In addition, about various changes for the form of the above-mentioned enforcement and the correction, it is apparent to these skilled in the art. Such a change and the correction may be performed without leaving the purpose of the subject and the range and without weakening an advantage aimed at. In other words such a change and a correction intend to be within the range of the request.

For example, the system shown in FIG. 1 may be configured so that the user uses the mobile terminal apparatus 1 and thereby logs in the nearest image forming apparatus 2, for example, using near field wireless communication. In such a case, for example, a driver of the image forming apparatus 2 is installed in the mobile terminal apparatus 1, and the driver uses the wireless communication device 11 and thereby performs wireless communication with the image forming apparatus 2, and performs logging in the image forming apparatus 2, control of the image forming apparatus 2, and the like. In such a case, the application 22 may manage a history of logging in the image forming apparatus 2, determine the usage frequency, and set the notification strength on the basis of the determined usage frequency.

INDUSTRIAL APPLICABILITY

For example, the present invention is applicable to an image forming apparatus.

The invention claimed is:

1. A mobile terminal apparatus, comprising:
a wireless communication device that receives a consumables exhaustion signal from a wireless beacon of an image forming apparatus;
a notification processing unit that activates a notification device that notifies of consumables exhaustion when receiving the consumables exhaustion signal transmitted without specifying a receiver by the wireless beacon, and
wherein the notification processing unit notifies of the consumables exhaustion using the notification device with a notification signal strength corresponding to a usage frequency of the image forming apparatus so that a larger notification strength is set for the higher usage frequency.

2. A mobile terminal apparatus, comprising:
a wireless communication device that receives a consumables exhaustion signal from a wireless beacon of an image forming apparatus;
a notification processing unit that activates a notification device that notifies of consumables exhaustion when receiving the consumables exhaustion signal transmitted without specifying a receiver by the wireless beacon; and
wherein the notification processing unit notifies of the consumables exhaustion using the notification device with a notification signal strength corresponding to a year that a user of this mobile terminal apparatus joined a company in so that a larger notification strength is set for the later year that the user joined the company in.

3. A mobile terminal apparatus, comprising:
a wireless communication device that receives a consumables exhaustion signal from a wireless beacon of an image forming apparatus;
a notification processing unit that activates a notification device that notifies of consumables exhaustion when receiving the consumables exhaustion signal transmitted without specifying a receiver by the wireless beacon;
wherein in case of paper sheet empty, the consumables exhaustion signal indicates a paper sheet cassette of the paper sheet empty; and
the notification processing unit determines a notification signal strength corresponding to the paper sheet cassette and notifies of consumables exhaustion using the notification device with a determined notification strength.

* * * * *